Sept. 22, 1964 G. STAVIS ETAL 3,150,323
COINCIDENT FREQUENCY TRACKER IN WHICH OSCILLATION GENERATOR GENERATES TWO DISTINCT FREQUENCIES ALTERNATELY
Filed Feb. 26, 1958 3 Sheets-Sheet 1

INVENTORS.
GUS STAVIS
GEORGE R. GAMERTSFELDER
WILLIAM B. LURIE
BY
H. S. Mackay
ATTORNEY.

INVENTORS.
GUS STAVIS
GEORGE R. GAMERTSFELDER
WILLIAM B. LURIE
BY
H. A. Mackey
ATTORNEY.

INVENTORS.
GUS STAVIS
GEORGE R. GAMERTSFELDER
WILLIAM B. LURIE
BY
H. L. Mackey
ATTORNEY.

3,150,323

COINCIDENT FREQUENCY TRACKER IN WHICH OSCILLATION GENERATOR GENERATES TWO DISTINCT FREQUENCIES ALTERNATELY

Gus Stavis, Ossining, George R. Gamertsfelder, Pleasantville, and William B. Lurie, New Rochelle, N.Y., assignors to General Precision Inc., a corporation of Delaware Filed Feb. 26, 1958, Ser. No. 717,783
8 Claims. (Cl. 325—430)

This invention relates to automatic signal frequency trackers employing resonant discriminators and more particularly to trackers containing band-pass filters.

Frequency trackers are required in aircraft navigational instruments employing the Doppler difference frequencies of microwave echoes. The frequency spectrum of such an echo fluctuates, making special apparatus necessary to track the fluctuating frequencies. Such apparatus is termed a frequency tracker.

A resonant frequency tracker includes a mixing modulator to which the Doppler signal spectrum, usually in the audio range, is introduced. One or more heterodyning signals are also introduced to the modulator, and the resulting sidebands are applied to a discriminator which includes one or two band-pass filters or other resonant element or elements. The discriminator output constitutes an error signal. This signal is made to control the frequencies of the heterodying signals in such a way as to reduce the error signal to zero.

In one form of frequency tracker the discriminator filter has a very narrow transmission band. The signals applied to it are two in number, have similar and broad frequency spectra, and intersect at a "crossover" frequency, their centers having a fixed frequency difference. The automatic loop adjusting operation shifts these spectra up or down together until the crossover frequency is exactly at the center of the transmission band of the band-pass filter. This causes the loop error signal to fall to zero and the loop is said to be balanced or nulled.

When the band-pass filter has a symmetrical frequency-transmission characteristic, and in the absence of drift with time or other change in center frequency, the filter transmission band is accurately positioned to the crossover point of the spectra. However, if the filter has an asymmetrical characteristic or if its frequency changes, the frequency tracker operation is inaccurate.

The circuits of this invention eliminate inaccuracies due to these two causes, filter asymmetry and drift. They do this by reversing one of the spectra, moving the spectra together until one is superimposed on the other, and placing the filter characteristic midway down one side of the composite Doppler spectrum. Loop balance is achieved when exact superimposition is indicated by equal powers of the two spectra transmitted by the filter. Due to this method of error sensing the shape of the filter characteristic does not affect the accuracy of frequency tracking, nor does a moderate amount of drift due to filter instability with temperature or time.

The resonant discriminator frequency tracker requires one or more dual elements in order to develop an error signal having sense or direction of error. The dual element may consist of a dual filter, or it may be a heterodyne oscillator emitting two heterodyning frequencies, or the dual element may lie outside of the frequency tracker altogether and furnish to it a dual Doppler input signal consisting of two spectra separated by a small frequency difference. The circuits of this invention apply to the second of these three forms of frequency tracker employing a dual heterodyne generator.

The purpose of this invention is to provide a resonant discriminator frequency tracker free from errors caused by filter asymmetry and drift.

More specifically, the purpose of this invention is to provide a frequency tracker which balances its loop by superimposing two derived Doppler spectra, and by employing a resonant filter transmission band offset from the superimposed spectra median frequency to sense the amount and direction of superimposition error.

A fuller understanding of the invention may be secured from the detailed description and drawings, in which.

Figure 1:
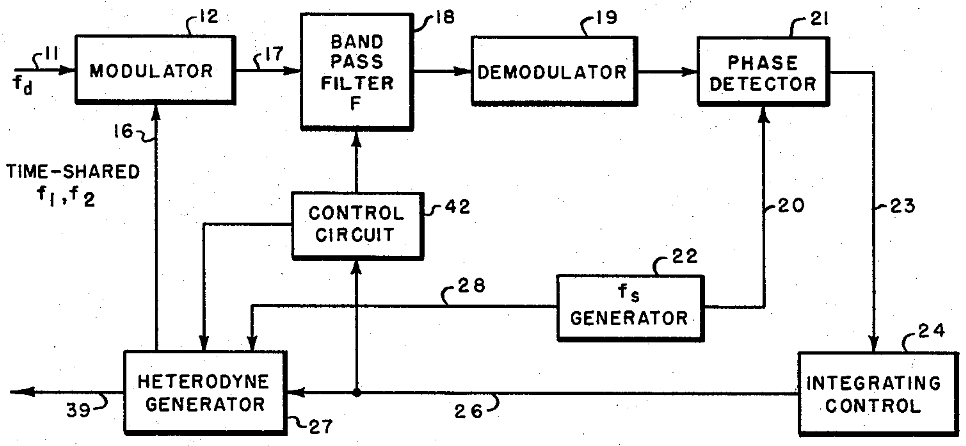
FIGURE 1 is a block diagram generally representing instrumentation of the invention.
Figure 2:
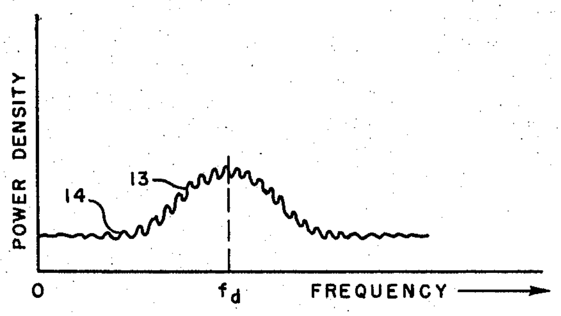
FIGURE 2 is a graph illustrating the frequency spectrum of one form of signal applied to a frequency tracker.

Referring now to FIG. 1, a signal to be frequency tracked is applied at input 11 to a modulator 12. The signal to be tracked is assumed to have characteristics usual for Doppler echo signals. Its frequency characteristic, FIG. 2, consists of a wideband spectrum having a center frequency of $f_d$. The bandwidth is some 12 or 15% of its center frequency. The form is generally symmetrical and generally Gaussian. The spectrum 13 rises from a noise level represented by the horizontal power density 14. The unevenness of the graph is intended to suggest minor variations and also fluctuations with time. The spectrum 13 may move up or down in frequency at a fairly rapid rate, and it is the function of a frequency tracker to maintain constant measurement of the center frequency $f_d$, even during such frequency movements. For example, the frequency $f_d$ may vary between 2 and 20 kilocycles per second.

Again referring to FIG. 1, the modulator 12 receives heterodyning input frequencies at a second input 16 which are time shared typically at a 25 c.p.s. rate and emits modulation products at output 17. These products including both upper and lower sideband frequencies are acted upon in a single-filter discriminator comprising band-pass filter 18, demodulator 19, and phase detector 21. The filter 18 has a center frequency of transmission F and a transmission band which is narrow compared to the widths of the spectra applied to it. A phase reference voltage having a frequency $f_s$ of 25 c.p.s. and a square waveform is secured from generator 22 and applied through conductor 20 to the phase detector 21. The phase detector output consisting of a direct potential error signal is applied through conductor 23 to an integrating control component 24. The integrating control 24 has one or more outputs having potential or other quality representative of a frequency $v$ which is identical with the Doppler average frequency except for the loop balance error $\epsilon$. That is $$v=f_d+\epsilon \quad (1)$$

in which the error $\epsilon$ may be positive or negative. The output 26 of the integrating control 24 is applied to a generator 27 having two output signals of different but related frequencies term $f_1$ and $f_2$. These two output signals are time-shared at the rate of 25 c.p.s. in synchronism with the operation of phase detector 21, the generator 27 being switched by a switching potential applied from generator 22 through conductor 28. The outputs of generator 27 which frequencies $f_1$ and $f_2$ are alternately applied through conductor 16 to the modulator 12.

In the operation of this circuit the resonant frequency F of filter 18 must be selected so as to be outside of the Doppler input signal frequency range. Let F, for example, be 25 kc.p.s. Then in terms of the outputs of generator 27

$$f_1=F+\frac{\Delta}{2}+\nu, \qquad (2)$$

and $$f_2=F+\frac{\Delta}{2}-\nu, \qquad (3)$$

in which $\Delta$ is the bandwidth between half power points of one of the derived or sideband Doppler spectra presented to the filter 18. These heterodying signals $f_1$ and $f_2$ are multiplied in modulator 12 by the Doppler input spectrum in conductor 11 to form two higher sideband spectra and two lower sideband spectra having median frequencies as follows. During one half-cycle of the switching period the heterodyning signal $$f_1=F+\frac{\Delta}{2}+\nu$$

is applied to the modulator, forming derived Doppler spectra having the upper and lower sideband center frequencies of $$F+\frac{\Delta}{2}+\nu+f_d \text{ and } F+\frac{\Delta}{2}+\nu-f_d$$

Figure 3:
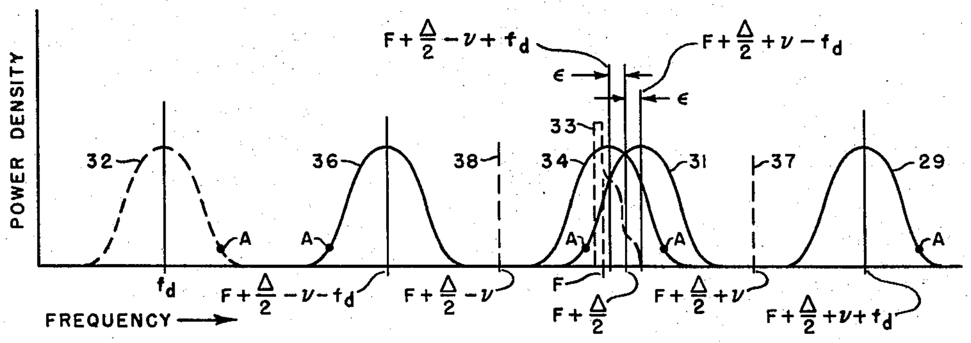
FIGURE 3 is a frequency graph of the four sideband products of the modulator.

These frequency spectra are plotted at 29 and 31 respectively on the frequency versus power density graph of FIG. 3. The input signal having a frequency $f_d$, for example, of 6,000 c.p.s., is plotted as spectrum 32, and the narrow filter characteristic is plotted with exaggerated width at 33, having an effective center frequency F.

Similarly, during the other half of the switching cycle derived Doppler spectra having the sideband center frequencies of $$F+\frac{\Delta}{2}-\nu+f_d \text{ and } F+\frac{\Delta}{2}-\nu-f_d$$

are found, and are indicated as spectra 34 and 36 respectively. The input frequencies to the modulator, $$F+\frac{\Delta}{2}+\nu,\ F+\frac{\Delta}{2}-\nu,$$

and $f_d$, are not found in the modulator output when the modulator is of the balanced type which supresses input frequencies. The positions of these frequencies are, however, indicated in FIG. 3 by the dashed lines 37, 38, and 32. The suppression of these frequencies in the filter input is of little importance as, if present, they are filtered out by the filter.

The spectra 31 and 34 having center frequencies $$F+\frac{\Delta}{2}+\nu-f_d \text{ and } F+\frac{\Delta}{2}-\nu+f_d$$

are the only ones cutting the filter transmission band. They lie at frequency differences of $\epsilon$ from a median frequency of $$F+\frac{\Delta}{2}$$

so that at loop balance the error $\epsilon$ becomes zero, $\nu=f_d$, and the two spectra are superimposed. When the Doppler spectrum is symmetrical these superimposed forms are congruent.

When loop error exists as shown in FIG. 3 the filter transmits much more power of the spectrum 34 than of the spectrum 31, but when $\nu<f_d$, the error is of opposite sense, the positions of spectra 31 and 34 are interchanged, and the filter transmits more of spectrum 31 power than of spectrum 34 power.

Upper and lower sidebands are mirror images of each other, therefore in FIG. 3 the upper or higher frequency side A of the input Doppler spectrum 32 corresponds with the upper or higher frequency sides A of the two upper sidebands 29 and 34. However, in the lower sidebands 31 and 36, which are mirror images of the upper sidebands, their corresponding sides, also marked A, are their lower frequency sides. Thus the two intersecting sidebands 31 and 34 are reversed relative to each other because one is a lower sideband and the other is a higher sideband. Because of this reversal the filter band 33 samples the "A" side of one spectrum and the other side of the other spectrum.

It is remembered that the spectra 31 and 34 do not exist simultaneously, but alternately at the rate of 25 c.p.s. Therefore at unbalance the power transmitted through the filter contains a 25 c.p.s. component having a phase which depends on which spectrum power preponderates. When the spectra 31 and 34 have become exactly superimposed the 25 c.p.s. filter output falls to zero. The filter output is demodulated in demodulator 19, FIG. 1, and the 25-cycle output thereof is applied to phase detector 21. The output thereof in conductor 23 is a direct potential having an amplitude proportional to the error of superimposition of the two spectra and a polarity representing the sense of error.

This error signal is applied to the integrating control 24, in which one or more signals representative of the magnitude of the loop balancing frequency $\nu$ are generated. In accordance with normal integrator action, so long as an integrator input error signal exists the integrator outputs will increase or decrease, depending on the polarity of the error signal.

The integrator output signals are applied through conductor 26 to control the generator 27 having two output signals with frequencies $f_1$ and $f_2$ which, as stated, are functions of $\nu$. These output frequencies are changed, under control of the generator input signal or signals, in such direction as to bring the error signal $\epsilon$ to zero, thus balancing the loop. The loop balancing signal $\nu$ is then equal to the Doppler spectrum center frequency $f_d$, and an output conductor 39 carrying a signal representing $\nu$ is taken from the generator 27, whose output is the frequency tracker output signal.

Figure 4:
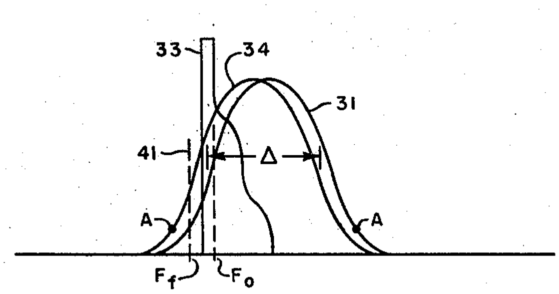
FIGURE 4 is a frequency graph of the filter band and two nearly superimposed spectra.

FIGURE 4 illustrates more clearly the action of the filter when the loop is almost exactly balanced. The area under spectrum 34 within the filter transmission band 33, representing spectrum power transmitted, is very nearly the same as the area under spectrum 31. It is seen that when the Doppler spectrum is symmetrical, as is almost always the case, filter characteristic asymmetry can cause no error in indication of the superimposition condition.

Filter drift causes no error if not large enough to move the filter band outside of its half of the superimposed Doppler spectra. Let the filter frequency be $F_f$ and the generator central or base frequency be $$F_0+\frac{\Delta}{2}$$

The sidebands of interest are then $$F_0+\frac{\Delta}{2}+\nu-f_d$$

and $$F_0+\frac{\Delta}{2}-\nu+f_d$$

At balance the two spectra will be coincident and their centers will have the frequency $$F_0+\frac{\Delta}{2}$$

Now if the filter characteristic center frequency $F_f$ has drifted to a slightly lower frequency than $F_0$, $F_f$ will be at the position 41. The obvious result, for a symmetrical Doppler spectrum, will be that there is no loss of balance accuracy, but that a somewhat weaker or stronger error signal will be obtained during the balancing action. That is to say, drift affects the frequency tracker sensitivity but not its accuracy. These advantageous features of freedom from errors caused by filter asymmetry and drift, achieved by the described principle of error generation by superimposition of derived spectra, uniquely distinguish this frequency tracker from all preceding frequency trackers.

In many uses of Doppler radio instruments, such as in measuring aircraft speed, it is found that the frequency bandwidth of the received signal spectrum is directly proportional to the Doppler median frequency. In order to maintain constant filtering action it is desirable to make the filter transmission bandwidth proportional to the Doppler spectrum bandwidth and therefore to $f_d$. For a similar reason it is desirable to modify the heterodyning frequencies $f_1$ and $f_2$ in accordance with $f_d$ since they contain $\Delta$ as a component Equations 2 and 3 and $\Delta$ should be maintained as defined, equal to the spectrum width. These refinements may be accomplished by conventional means, a control circuit 42, FIG. 1, controlling the filter 18 and generator 27 in accordance with a function of $\nu$ secured from integrating control 24.

Figure 5:
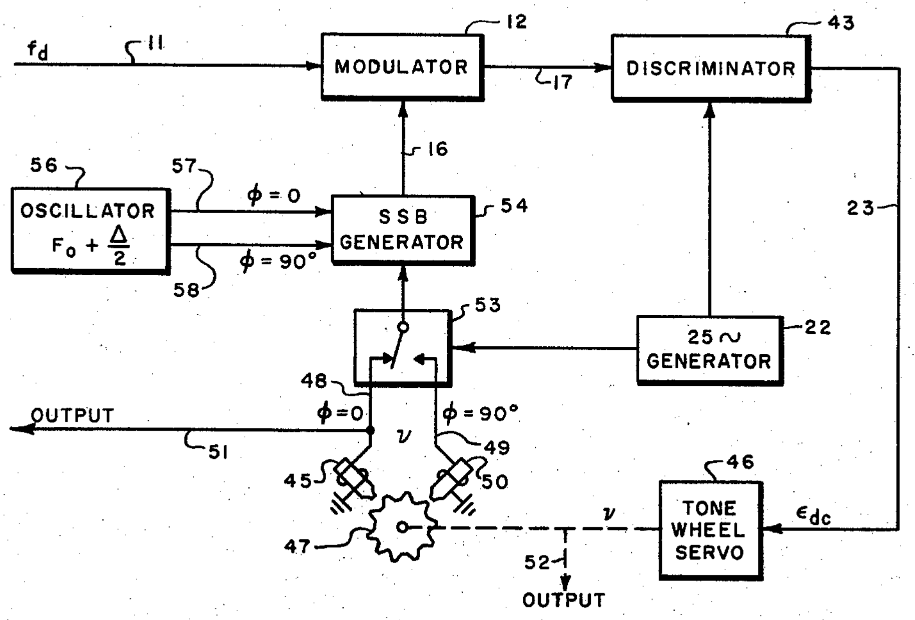
FIGURE 5 is a block diagram of one embodiment of the invention using a single-sideband generator, tone wheel and servomechanism.

FIGURE 5 illustrates one form which the integrating control 24, FIG. 1 and the heterodyne generator 27 can take. The input signal is applied at input 11, FIG. 5, to the modulator 12 and the sideband outputs are applied to the discriminator 43, which may have the form described in connection with FIG. 1. The output is applied through conductor 23, FIG. 5, to a rate servomechanism 46 rotating a tone wheel 47. This tone wheel consists of a soft iron serrated wheel revolving near two magnet cores 45 and 50 containing permanent magnets. It thus operates as an induction generator to generate alternating currents in the windings surrounding cores 45 and 50. The output potentials thereof in conductors 48 and 49 have, of course, the same frequency, but the magnets are so positioned circumferentially that the output phases are in quadrature. One of these outputs at conductor 51 serves also as the frequency tracker output or, alternatively, the speed of shaft 52 or its integral, the elapsed angle, may be employed as the tracker output. The two tone wheel outputs on conductors 48 and 49 are applied to a switch circuit 53, operated at 25 c.p.s. from the generator 22, and the output is applied to a single-sideband generator 54. An oscillator 56 generates a signal having a fixed frequency of $$F_0+\frac{\Delta}{2}$$

This signal is transmitted at two phases in quadrature through conductors 57 and 58 to the single-sideband generator 54. This generator generates upper and lower sidebands in alternation at the rate of 25 c.p.s., their frequencies being $$F_0+\frac{\Delta}{2}+\nu \text{ and } F_0+\frac{\Delta}{2}-\nu$$

the method and means being as described in the Proceedings of the Institute of Radio Engineering for December, 1956, on page 1719. With balanced modulation as there suggested only these frequencies appear at the single-sideband generator output 16. These two heterodyning signals are applied to the modulator 12.

In the operation of the circuit of FIG. 5 the alternating single-sideband generator outputs heterodyne the Doppler input spectrum having the central frequency $f_d$ to form four spectra, the two adjacent or intersecting spectra being of interest and having the central frequencies of $$F_0+\frac{\Delta}{2}+\nu-f_d \text{ and } F_0+\frac{\Delta}{2}-\nu+f_d$$

Their departure from a central frequency of $$F_0+\frac{\Delta}{2}$$

is $$\epsilon_{ac}=\nu-f_d \tag{4}$$

$\epsilon_{ac}$ being a 25 c.p.s. error potential. $F_0$ is equal to the filter central frequency $F_f$ except for any filter error which affects the amount but not the phase of the error signal $\epsilon_{ac}$. This error signal $\epsilon_{ac}$ is phase detected within the discriminator 43 to produce a proportional direct current error signal $\epsilon_{dc}$ in conductor 23. This signal controls the tone wheel speed through its rate servomechanism, and this controls the heterodyne signal frequencies which are functions of $\nu$. The loop feedback action operates to reduce $\epsilon$ to zero, when $\nu$ becomes equal to $f_d$.

In place of the single-sideband generator 54 and associated components a frequency-modulated generator or oscillator may be employed, and in place of the tone wheel 47 and its controlling servomechanism 46 an electronic integrating circuit may be employed. Either of these substitutions may be made alone, or both together.

Figure 6:
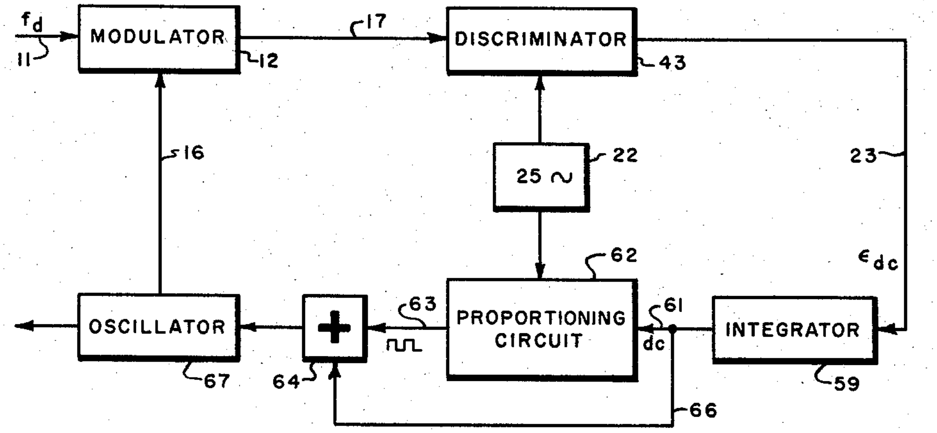
FIGURE 6 is a block diagram of another embodiment of the invention using an integrator and employing frequency modulation.

FIGURE 6 illustrates a circuit employing both substitutions. The modulation products of modulator 12 are applied to discriminator 43 and the error output signal, $\epsilon_{dc}$, in conductor 23 is applied to an electronic integrator 59 of the Miller feedback type. The direct-current voltage level in output conductor 61 increases or decreases in accordance with the direct current input level and polarity, and remains constant when $\epsilon_{dc}$ equals zero. The integrated output signal is applied to a proportioning circuit 62 to which a 25 c.p.s. potential is also applied from generator 22. The output on conductor 63 is a 25 c.p.s. square wave alternating potential having a peak-to-peak potential difference proportional to the direct potential applied from conductor 61. This alternating potential in conductor 63 is added in adding circuit 64 to a direct potential applied from the output of integrator 59 through conductor 66. The sum of these potentials, being a direct potential fluctuating at 25 c.p.s., is applied to control an oscillator 67 which may consist, for example, of a free-running multivibrator linearly controllable in its output frequency by a direct current bias applied to its grid return circuits.

Figure 7:
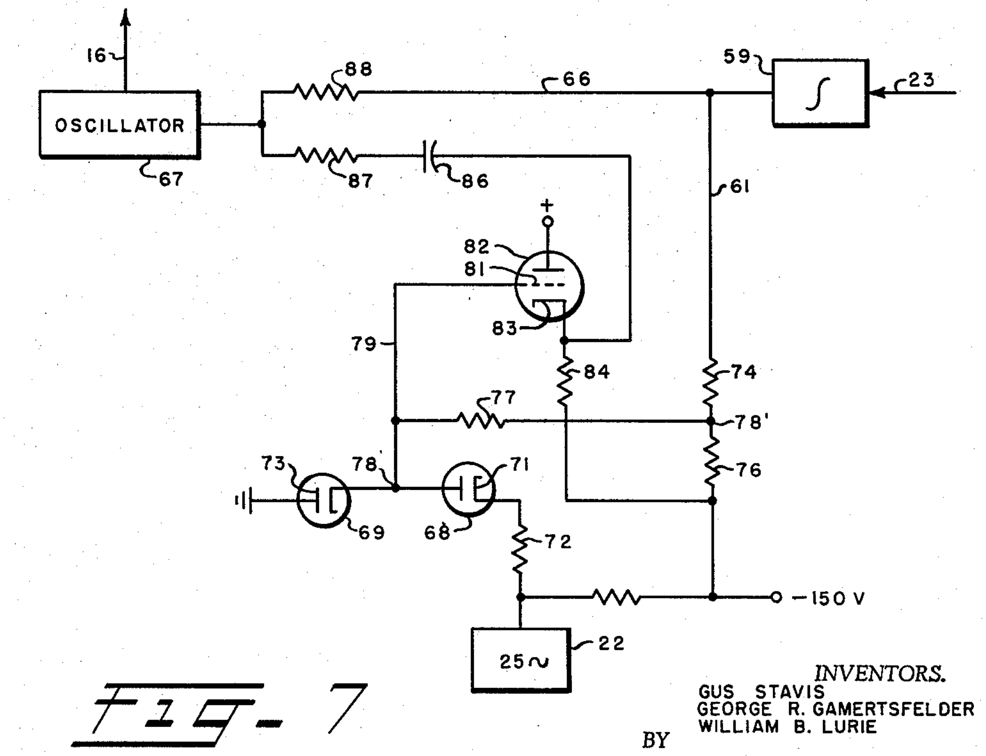
FIGURE 7 is a schematic diagram of a proportioning circuit used in connection with the invention.

The schematic circuits of the proportioning component 62 and adding circuit 64 are depicted in FIG. 7. The proportioning circuit comprises two diodes, 68 and 69, connected in series, with the cathode 71 of diode 68 connected through a resistor 72 to the 25 c.p.s. generator 22. The anode 73 of diode 69 is grounded. A voltage divider consisting of resistors 74 and 76 is connected between the output conductor 61 of the integrator 59 and a negative potential source. The divider common junction 78' is connected through resistor 77 to the common junction 78 of the diodes 68 and 69. The diode junction 78 is connected through conductor 79 to the control grid 81 of a triode cathode follower 82 having its cathode 83 returned through resistor 84 to negative potential. Cathode 83 is coupled through capacitor 86 to an adding circuit consisting of resistors 87 and 88, with the sum output applied to control oscillator 67. A direct connection 66 from integrator 59 to the adding circuit resistor 88 controls the basic bias level of the oscillator.

In the operation of this proportioning circuit, when the 25 c.p.s. power applied to cathode 71 is negative, both diodes 68 and 69 conduct and their common junction 78 and grid 81 are placed at ground potential. During the other half cycle of the 25 c.p.s. supply cathode 71 is positive and both diodes become nonconductive. Junction 78 and grid 81 immediately assume the potential of the divider junction 78', which in turn is proportional to the integrator output potential level. Very nearly the same potential is coupled from cathode 83 through capacitor 86 to the resistor 87 of the adding circuit. Thus a 25 c.p.s. potential is applied to this resistor 87 having a peak-to-peak potential representative of the integrator output level. This potential is mixed with and added to the direct potential applied to resistor 88 so that the average 25 c.p.s. potential is at this direct potential level.

The output of oscillator 67, FIGS. 6 and 7, consists of a signal which is frequency modulated at 25 c.p.s., its frequency excursions having the peak-to-peak range of $2\nu$ and its output frequency being alternately, $$F_0+\frac{\Delta}{2}+\nu \text{ and } F_0+\frac{\Delta}{2}-\nu$$

This output is applied through conductor 16 to modulator 12, FIG. 6.

In the operation of this circuit the discriminator error output signal $\epsilon_{dc}$ in conductor 23 causes the integrator output level to change, increasing or decreasing the oscillator frequency excursion $\pm\nu$ in such direction as to bring $\nu$ into equality with the input signal $f_d$. The error signal then becomes zero, the integrator output becomes constant, the proportioning circuit peak-to-peak output becomes constant and the oscillator frequencies become constant.

It is seen that the two central spectra of the four derived Doppler spectra applied to the discriminator and passed in part by its filter have exactly the same compositions as those described in connection with FIGS. 1 and 5, namely, $$F_0+\frac{\Delta}{2}+\nu-f_d \text{ and } F_0+\frac{\Delta}{2}-\nu+f_d$$

$F_0$ being equal to the filter frequency $F_f$ except for errors of the filter characteristic. At balance, therefore, the two derived spectra will be superimposed with a central frequency of $$F_0+\frac{\Delta}{2}$$

and any difference between $F_f$ and $F_0$ will cause no frequency tracker error, but will merely change the frequency tracker sensitivity. Thus filter asymmetry and filter drift will have no effect on the frequency tracker accuracy.

What is claimed is:

1. A frequency tracker for following and measuring an input signal consisting of a band of frequencies comprising, a modulator, means for impressing said input signal on said modulator, means for alternately impressing on said modulator two alternating voltages of different frequencies whereby each when mixed in said modulator with said input signal provides a group of signals including an upper and a lower side band signal at the output of the modulator, and means responsive to the upper side band of one group of signals and to the lower side band of the other group for adjusting the frequency difference of said two alternating voltages to twice the frequency of said changeable frequency input signal.

2. A frequency tracker comprising an input circuit for applying a changeable frequency signal to a modulator, means for alternately impressing on said modulator two alternating voltages of different frequencies whereby each when mixed with said input signal provides a group of signals including an upper and a lower side band signal at the output of the modulator, a band-pass filter having a selected center transmission frequency, which is displaced from the average of said two different frequencies by a predetermined amount, connected to the output of said modulator, and means responsive to the output from said filter for differentially adjusting the frequencies of said two alternating voltages so that their frequency difference equals twice the frequency of the changeable frequency input signal.

3. A frequency tracker comprising, an input circuit applying a changeable frequency signal to a modulator, means for alternately impressing at a selected rate upon said modulator two alternating voltages of different frequencies whereby each when mixed with said input signal provides at the output of said modulator a group of signals of including an upper and a lower side band signal, a bandpass filter having a selected center transmission frequency connected to the output of said modulator, said selected center transmission frequency being displaced from the average of said two different frequencies by an amount which is substantially equal to five percent of said average, demodulating means for recovering the selected rate envelope of the bandpass filter output, and means responsive to the output of said demodulating means for adjusting the frequency difference between said alternating voltage frequencies to equal twice the frequency of said changeable frequency signal.

4. A frequency tracker for following and measuring the center frequency of an input signal consisting of a band of frequencies comprising, a modulator, means impressing said input signal on said modulator, a low frequency timing rate generator, means for alternately impressing on said modulator at said timing rate two alternating voltages of different frequencies, a bandpass filter having a predetermined center transmission frequency connected to the output of said modulator, said center transmission frequency being displaced from the average of said two different frequencies by a predetermined amount, a demodulator rectifying the output of said bandpass filter, a phase detector timed by said timing rate generator and connected to the output of said demodulator to secure a unidirectional current having a polarity and amplitude dependent upon the phase and amplitude of the output of the demodulator, an integrating amplifier connected to the output of said phase detector and emitting a continuous direct voltage proportional to the time integral of the voltage output of said phase detector, a proportioning circuit amplitude-modulating said continuous direct voltage to an amount depending on the magnitude thereof, said modulation being at said timing rate, and said circuit means applying the output of said proportioning circuit to said oscillator means to adjust the difference of the frequencies of said two alternating voltage outputs thereof to equal twice the median frequency of said input signal.

5. An automatic signal frequency tracker comprising, a modulator having a changeable signal to be tracked composed of a band of frequencies which includes a central frequency imposed thereon, a generator generating a pair of heterodyning signals the frequencies of which differ from each other by an amount equal to substantially twice the algebraic sum of the central frequency of said changeable signal and an erratum frequency, said pair of frequencies being impressed alternately on said modulator whereby said modulator produces a plurality of upper and lower sideband frequency signals, a discriminator having said sideband frequency signals impressed thereon and producing therefrom at least one error signal representative of said erratum frequency, means integrating said error signal and producing therefrom a control signal and means for controlling said generator by said control signal whereby a closed loop is formed which superimposes one upper and one lower of said sideband frequency signals and reduces said erratum frequency to zero.

6. An automatic signal frequency tracker comprising, a modulator having a changeable signal frequency band which includes a central frequency to be tracked impressed thereon, a generator alternately producing one or the other of a pair of heterodyning signals which differ from each other in frequency by twice the algebraic sum of the central frequency of the changeable signal and an erratum frequency, said pair of heterodyning signals impressed on said modulator whereby the output of said modulator comprises a plurality of upper and lower sideband frequency signals, discriminator means including a resonant filter having said sideband frequency signals impressed thereon and producing therefrom an error signal whose amplitude is representative of said erratum frequency, means for integrating said error signal to produce a control signal and means controlling the frequencies at the generator output by said integrated error signal whereby a closed loop is formed which reduces said error signal to zero and superimposes one upper and one lower of sideband frequency signals the frequencies of which include the resonant frequency of said filter.

7. An automatic signal frequency tracker comprising, a modulator receiving a changeable wide frequency band signal which includes a central frequency to be tracked, a generator alternately generating separate ones of a pair of heterodyning signals which are separated in frequency by substantially twice the algebraic sum of the central frequency of said wide frequency band signal and an erratum frequency, means applying said heterodyning signals to said modulator, discriminator means including a narrow band filter having a resonant frequency higher than said central frequency connected to the output of said modulator whereby a pair of sideband signals produced by said modulator having frequencies which include said resonant frequency are applied to said filter, the average frequency of said pair of side band signals differing from said resonant frequency by an amount norminally equal to one-half of the width of either of said sideband frequency spectra, said discriminator emitting an error signal representing in amplitude and sense said erratum frequency, integrating means controlled by said error signal and producing a control signal therefrom, and means applying said control signal to said generator to control the frequencies of said heterodyning signals whereby a closed loop is formed which varies said deterodyning signals in such direction as to reduce said erratum frequency and to superimpose one of said pair of sideband signals on the other one to have equal energy transmission through said filter and to reduce said error signal toward zero.

8. An automatic signal frequency tracker comprising, an oscillator generating a first pair of signals of equal frequency and in phase quadrature, a tone wheel generating a second pair of signals of equal frequency and in phase quadrature, a single sideband generator having said first pair of signals impressed thereon, means for alternately applying said second pair of signals to said single sideband generator whereby the output thereof comprises alternate heterodyne signals the frequency of one of which is equal to the sum of the oscillator and tone wheel signals and the frequency of the other of which is equal to the difference of the oscillator and tone wheel signals, a modulator having a changeable signal to be tracked composed of a band of frequencies and said alternately produced heterodyne signals impressed thereon whereby the output of said modulator comprises at least two sideband signals whose frequencies closely approximate each other and whose mean frequency is equal to the frequency of said first pair of signals, a discriminator including a resonant filter having the output of said modulator impressed thereon and producing therefrom an error signal representative of the departure of the center frequencies of the modulator sideband signals from the frequency of said first pair of signals, a servo having said error signal impressed thereon actuating a shaft at a speed corresponding to the magnitude of said error signal, and means operating said tone wheel in accordance with said shaft.

References Cited in the file of this patent

UNITED STATES PATENTS

| | | |
|---|---|---|
| 2,725,555 | Hopper | Nov. 29, 1955 |
| 2,866,090 | Sherr | Dec. 23, 1958 |
| 2,866,193 | Lawton | Dec. 23, 1958 |
| 2,896,074 | Newsom | July 21, 1959 |
| 2,908,903 | Berger | Oct. 13, 1959 |

OTHER REFERENCES

McMahon: "The AN/APN-81 Doppler Navigation System" pp. 202–211, IRE Transaction On Aeronautical and Navigational Electronics, December 1957.